(12) United States Patent
Wheatley et al.

(10) Patent No.: US 8,608,362 B2
(45) Date of Patent: Dec. 17, 2013

(54) COLLIMATING LIGHT ENGINE

(75) Inventors: John A. Wheatley, Lake Elmo, MN (US); Rolf W. Biernath, Wyoming, MN (US); Michael A. Meis, Stillwater, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 110 days.

(21) Appl. No.: 12/996,409

(22) PCT Filed: May 15, 2009

(86) PCT No.: PCT/US2009/044102
§ 371 (c)(1),
(2), (4) Date: Dec. 6, 2010

(87) PCT Pub. No.: WO2009/151869
PCT Pub. Date: Dec. 17, 2009

(65) Prior Publication Data
US 2011/0075398 A1    Mar. 31, 2011

Related U.S. Application Data (60) Provisional application No. 61/061,225, filed on Jun. 13, 2008.

(51) Int. Cl.
*F21V 7/04* (2006.01)
(52) U.S. Cl.
USPC .............. 362/609; 362/247; 362/296.01
(58) Field of Classification Search
USPC .............. 362/97.1–97.4, 609, 612, 613, 362/630–632, 249.01, 249.02, 247, 248, 362/296.1, 297, 303, 305, 346, 347
See application file for complete search history.

(56) References Cited

U.S. PATENT DOCUMENTS

| | | | |
|---|---|---|---|
| 5,882,774 A | 3/1999 | Jonza et al. | |
| 6,007,209 A | 12/1999 | Pelka | |
| 6,396,469 B1 | 5/2002 | Miwa et al. | |
| 6,424,329 B1 | 7/2002 | Okita | |
| 7,113,152 B2 | 9/2006 | Ben-David et al. | |
| 7,163,331 B2 * | 1/2007 | Suzuki et al. | 362/610 |
| 7,182,480 B2 * | 2/2007 | Kan | 362/242 |
| 7,304,425 B2 | 12/2007 | Ouderkirk et al. | |
| 2002/0006039 A1 * | 1/2002 | Ueda et al. | 362/217 |
| 2002/0015297 A1 * | 2/2002 | Hayashi et al. | 362/27 |
| 2005/0280756 A1 | 12/2005 | Kim et al. | |
| 2006/0187650 A1 | 8/2006 | Epstein et al. | |
| 2006/0209540 A1 * | 9/2006 | Izardel | 362/247 |
| 2006/0221638 A1 * | 10/2006 | Chew et al. | 362/613 |

(Continued)

FOREIGN PATENT DOCUMENTS

| | | |
|---|---|---|
| EP | 1 881 364 | 1/2008 |
| GB | 2 424 746 | 4/2006 |

(Continued)

*Primary Examiner* — Julie Shallenberger (57) ABSTRACT

Collimating light engines, methods of making collimating light engines, and articles incorporating collimating light engines are disclosed. In one aspect, a light source and circuitry can be disposed between a reflector and a reflective baffle to form a collimating light engine. The light source is at least partially obscured from view by the reflective baffle. Light emitted from the light source is partially collimated upon leaving the light engine. Light uniformity of the output surface of a backlight can be proved by disposing an array of the collimating light engines in the backlight

19 Claims, 10 Drawing Sheets

(56) References Cited

U.S. PATENT DOCUMENTS

| | | |
|---|---|---|
| 2006/0239030 A1* | 10/2006 | Chen .................. 362/606 |
| 2006/0274550 A1 | 12/2006 | Liu et al. |
| 2006/0290842 A1 | 12/2006 | Epstein et al. |
| 2007/0092728 A1 | 4/2007 | Ouderkirk et al. |
| 2007/0102720 A1 | 5/2007 | Park |
| 2007/0139961 A1* | 6/2007 | Cheah et al. .......... 362/612 |
| 2007/0247869 A1* | 10/2007 | Lang et al. ........... 362/612 |
| 2007/0257266 A1 | 11/2007 | Leatherdale et al. |
| 2007/0274096 A1* | 11/2007 | Chew et al. .......... 362/609 |
| 2008/0049449 A1* | 2/2008 | Liu et al. ............. 362/617 |
| 2008/0064096 A1 | 3/2008 | Renauld et al. |
| 2008/0064115 A1 | 3/2008 | Hiramatsu et al. |
| 2008/0064125 A1 | 3/2008 | Peumans et al. |
| 2008/0064133 A1 | 3/2008 | Lee et al. |
| 2008/0266900 A1* | 10/2008 | Harbers et al. ........ 362/609 |
| 2009/0290097 A1* | 11/2009 | Kim et al. ............ 349/65 |
| 2011/0090423 A1 | 4/2011 | Wheatley et al. |

FOREIGN PATENT DOCUMENTS

| | | |
|---|---|---|
| JP | 10-125959 | 5/1998 |
| JP | 2008-03220 | 1/2008 |
| JP | 2008-34273 | 2/2008 |
| KR | 10-0667817 | 1/2007 |
| WO | WO 2007/049373 | 3/2007 |
| WO | WO 2008/013072 | 1/2008 |
| WO | WO 2008/032275 | 3/2008 |
| WO | WO 2008/047284 | 4/2008 |

* cited by examiner

COLLIMATING LIGHT ENGINE

CROSS REFERENCE TO RELATED APPLICATIONS

This application is a national stage filing under 35 U.S.C. 371 of PCT/US2009/044102, filed May 15, 2009, which claims priority to U.S. Application No. 61/061,225, filed Jun. 13, 2008, the disclosure of which is incorporated by reference in its/their entirety herein.

FIELD

The present disclosure relates to illumination devices that partially collimate light, suitable for use in illuminating a display or other graphics from behind, such as a backlight.

BACKGROUND

Backlights can be considered to fall into one of two categories depending on where the internal light sources are positioned relative to the output area of the backlight, where the backlight "output area" corresponds to the viewable area or region of the display device. The "output area" of a backlight is sometimes referred to herein as an "output region" or "output surface" to distinguish between the region or surface itself and the area (the numerical quantity having units of square meters, square millimeters, square inches, or the like) of that region or surface.

The first category is "edge-lit". In an edge-lit backlight, one or more light sources are disposed—from a plan-view perspective—along an outer border or periphery of the backlight construction, generally outside the area or zone corresponding to the output area. Often, the light source(s) are shielded from view by a frame or bezel that borders the output area of the backlight. The light source(s) typically emit light into a component referred to as a "light guide", particularly in cases where a very thin profile backlight is desired, as in laptop computer displays. The light guide is a clear, solid, and relatively thin plate whose length and width dimensions are on the order of the backlight output area. The light guide uses total internal reflection (TIR) to transport or guide light from the edge-mounted lamps across the entire length or width of the light guide to the opposite edge of the backlight, and a non-uniform pattern of localized extraction structures is provided on a surface of the light guide to redirect some of this guided light out of the light guide toward the output area of the backlight. Such backlights typically also include light management films, such as a reflective material disposed behind or below the light guide, and a reflective polarizing film and prismatic BEF film(s) disposed in front of or above the light guide, to increase on-axis brightness.

In the view of Applicants, drawbacks or limitations of existing edge-lit backlights include: the relatively large mass or weight associated with the light guide, particularly for larger backlight sizes; the need to use components that are non-interchangeable from one backlight to another, since light guides must be injection molded or otherwise fabricated for a specific backlight size and for a specific source configuration; the need to use components that require substantial spatial non-uniformities from one position in the backlight to another, as with existing extraction structure patterns; and, as backlight sizes increase, increased difficulty in providing adequate illumination due to limited space or "real estate" along the edge of the display, since the ratio of the perimeter to the area of a rectangle decreases linearly (1/L) with the characteristic in-plane dimension L (e.g., length, or width, or diagonal measure of the output region of the backlight, for a given aspect ratio rectangle). It is difficult to inject light into a solid light guide at any point other than the periphery, due to costly machining and polishing operations.

The second category is "direct-lit". In a direct-lit backlight, one or more light sources are disposed—from a plan-view perspective—substantially within the area or zone corresponding to the output area, normally in a regular array or pattern within the zone. Alternatively, one can say that the light source(s) in a direct-lit backlight are disposed directly behind the output area of the backlight. A strongly diffusing plate is typically mounted above the light sources to spread light over the output area. Again, light management films, such as a reflective polarizer film, and prismatic BEF film(s), can also be placed atop the diffuser plate for improved on-axis brightness and efficiency. A disadvantage with attaining uniformity in direct-lit backlights is that the thickness of the backlight must be increased as the spacing between lamps is increased. Since the number of lamps directly impacts system cost, this trade-off is a drawback of direct-lit systems.

In the view of Applicants, drawbacks or limitations of existing direct-lit backlights include: inefficiencies associated with the strongly diffusing plate; in the case of LED sources, the need for large numbers of such sources for adequate uniformity and brightness, with associated high component cost and heat generation; and limitations on achievable thinness of the backlight beyond which light sources produce non-uniform and undesirable "punch-through", wherein a bright spot appears in the output area above each source. When using multicolor LED clusters such as red, green, and blue LEDs, there can also be color non-uniformities as well as brightness non-uniformities.

In some cases, a direct-lit backlight may also include one or some light sources at the periphery of the backlight, or an edge-lit backlight may include one or some light sources directly behind the output area. In such cases, the backlight is considered "direct-lit" if most of the light originates from directly behind the output area of the backlight, and "edge-lit" if most of the light originates from the periphery of the output area of the backlight.

It would be desirable to have a light source which can be assembled into a backlight easily and in a cost-effective manner. It would also be desirable to have a light source that could be used either in an edge-lit or a direct-light configuration. It would also be desirable to have a method of assembling a backlight having a wide range of sizes by using standardized components, where larger size is accomplished by addition of additional components.

SUMMARY

In one aspect, a collimating light engine is disclosed that includes a reflector having a first surface and a light source and circuitry affixed proximate the first surface. The collimating light engine further includes a baffle disposed over the light source and extending over a portion of the reflector so that the light source is obscured from view at angles less than 50 degrees form the normal to the reflector. In one aspect, a method for making a collimating light engine is disclosed that includes providing a reflector, providing a light source mounted on a planar circuitized substrate, forming the reflector to provide a baffle and a back reflector, and affixing the planar circuitized substrate between the baffle and the back reflector. The light source has an optical axis of emission generally parallel to the planar circuitized substrate; the baffle extends over a portion of the back reflector, and obscures the light source from view at angles less than 50 degrees from the normal to the back reflector.

In one aspect, a method for making a collimating light engine is disclosed that includes providing a reflector, providing a light source mounted on a planar circuitized substrate, affixing the planar circuitized substrate to the reflector, providing a baffle, and affixing the baffle over the light source. The light source has an optical axis of emission generally parallel to the planar circuitized substrate; the baffle extends over a portion of the back reflector, and obscures the light source from view at angles less than 50 degrees from the normal to the back reflector.

In one aspect, a method for making a collimating light engine is disclosed that includes providing a reflector, forming a circuit on the reflector, affixing a light source to the circuit, and forming the reflector to provide a baffle and a back reflector. The light source has an optical axis of emission generally parallel to the reflector; the baffle extends over a portion of the back reflector including the circuit and light source, and obscures the light source from view at angles less than 50 degrees from the normal to the back reflector.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is directed toward an efficient collimating light engine that can be used in a thin lighting element such as a backlight for a display. In the most generalized form, the light source for the engine is an LED array that is affixed to a flexible circuit, and sandwiched between two highly reflective elements formed into a wedge shape, so that light emitted from the LED array is partially collimated between the elements. In one embodiment, at least one of the highly reflective elements is a highly reflective film. The partial collimation of the light causes light to travel within a narrow range of angles, defined by the reflective surfaces. The collimated light can be suitable for use within a thin hollow cavity, such as a backlight.

In one aspect, the light engine includes of two strips of Enhanced Specular Reflector (Vikuiti™ ESR, available from 3M Company) film laminated with a string of 0.6 mm thick side emitting white LED arrays (typically a linear bank of several LED chips) on a flex circuit, positioned between the ESR strips. The LEDs are positioned between the ESR strips such that the thickness of the LED array lifts the strip adjacent to the light emitting surface of the LED array to form a light collimating wedge. The assembled light engines can be positioned on a reflective backplane in various arrangements depending on lighting and uniformity requirements. The strip of ESR that overlays the LED to form the upper surface of the wedge can be referred to as a baffle, since it also serves to obscure the LED from view when viewed from the top. As mentioned elsewhere, direct-lit backlights often suffer from "punchthrough" in which the very intense light immediately adjacent to the surface of the LED can leak through a diffuser sheet placed over the light. By providing the baffle, the LED light emitting surface cannot be viewed (and is thus obscured from view) except at very large angles from the perpendicular, for example, greater than 50, 60, 70, 75 or even greater than 80 degrees.

In one aspect, the light engine can use multiple LEDs mounted on a reflectorized rigid circuit board, also positioned between two reflective films such as ESR films. In one embodiment, the LEDs can be affixed to the circuit board so that light is emitted generally perpendicular to the board, the board is positioned so that the baffle is supported by an edge of the board, and the light from the LED is emitted so that light is partially collimated within the wedge. In one embodiment, the LED emits light within an angular spread of less than 360 degrees around an axis perpendicular to reflective backplane.

In one aspect, the baffle is positioned above the LED, and extends beyond the LED light emitting surface. In one embodiment, the baffle can be a separate film that intersects the back reflector. In another embodiment, the baffle can be integral with the back reflector, by forming the back reflector to include the baffle, such as by folding the back reflector into a wedge shape. The material used for the baffle can include of a reflector including reflective metals or interference reflectors, a partial reflector, a semi-specular reflector, an asymmetric reflector, or a combination thereof. In some embodiments, the baffle can be uniform so that the material and optical properties of the baffle are the same throughout. In other embodiments, the baffle can be non-uniform, such as having perforations, slits, serrations, grooves and the like to physically alter the baffle, or the baffle material can have non-uniform optical properties such as variations in both specular and diffuse reflectivity, which can both be wavelength dependent. In still other embodiments, at least a portion of the baffle can include down-converting materials, such as phosphors and the like, which can alter the spectral characteristics of light emitted from the light source.

In some embodiments, the baffle material can include ESR film. In other embodiments, the ESR film can be combined with thick "skin" layers, or be laminated to another film to increase the bend stiffness of the baffle. In some embodiments, the baffle can have a thickness of from about 5 to about 10 mils (0.13 to about 0.26 mm).

The baffle can provide any desired level of light collimation by appropriate choice of the baffle geometry. In one embodiment, the baffle includes a planar film that forms a wedge over the LED array by contact with the top edge of the LED array. In other embodiments, the baffle may be formed into non-planar shapes by forming, bending or creasing it into parabolic shapes, compound parabolic shapes, stepped wedge shapes, diamond shapes and the like, as described elsewhere.

In one aspect, the light engine can be made on a continuous basis. In one embodiment, steps include providing a flexible bottom reflector such as ESR film, providing a LED array module mounted on a flexible circuit, affixing the flexible circuit to the flexible bottom reflector, and affixing a second piece of ESR film over the LED array module so that the light emission from the LED propagates in a direction approximately parallel to the bottom reflector. In another embodiment, steps include providing a flexible bottom reflector such as an ESR film, forming a baffle by folding the bottom reflector, providing an LED array module mounted on a flexible circuit, and affixing the LED array module between the baffle and bottom reflector.

In one aspect, the collimated light engine can be used in a lighting assembly, such as a thin backlight for an LCD. In one embodiment, the collimated light engine can be considered to be a "progressive injector" of light into the backlight. A backlight having larger size can readily be made by adding collimating light engines to boost the backlight output, since light decreases in intensity as it travels down the length of a backlight. In one embodiment, the collimated light engine can be used to perform at least three functions within the backlight. A first function is to inject light into the backlight within a relatively narrow range of angles approximately parallel to the back reflector, so that light can propagate down the length of the backlight. A second function is to obscure the bright surface of the LED array when viewed from the front of the display (i.e., perpendicular to the output surface), lessening punchthrough. A third function is to provide a reflective surface for light propagating down the length of the backlight, e.g., from other light sources, to change the direction of light propagation so that light can escape from the front of the backlight.

In one aspect, the first function is accomplished by the underside of the baffle that partially collimates light from the LED array. The baffle can have different properties on the underside (side closest to the LED) than the side closest to the backlight cavity. An LED typically emits light within a hemisphere from the light emitting surface, with the optical axis of the LED perpendicular to the light emitting surface. The LED is positioned so that the light generally propagates down the length of the backlight along the optic axis of the LED. A portion of the emitted light that propagates at angles outside the optical axis is reflected from the baffle and redirected toward the optical axis, partially collimating the light.

In one aspect, the second function is also accomplished by the length that the baffle extends over the LED array. Better collimation of light is accomplished by having a longer baffle, which in turn influences the angle that the baffle makes with the back reflector. An advantage of the longer baffle is that the surface of the LED is obscured from frontal view. In many instances, it can be beneficial to have the baffle extend far enough over the LED so that the LED is obscured from frontal view for all but very high angles, for example greater than about 50, 60, 70, 75 or even 80 degrees from the perpendicular to the back reflector.

In one aspect, the third function is accomplished by the design of the baffle. For example, the sloped surface of the top of the baffle is used to redirect the light. For a baffle positioned over the LED, the backside of the baffle can reflect light from behind the injector so that it is redirected to the top of the backlight. The baffle can also have a wedge shape or a diamond shape so that light propagating toward the exit aperture of the light engine is directed toward the top of the backlight. Configurations of baffles will be further described with reference to the Figures.

Figure 1A:
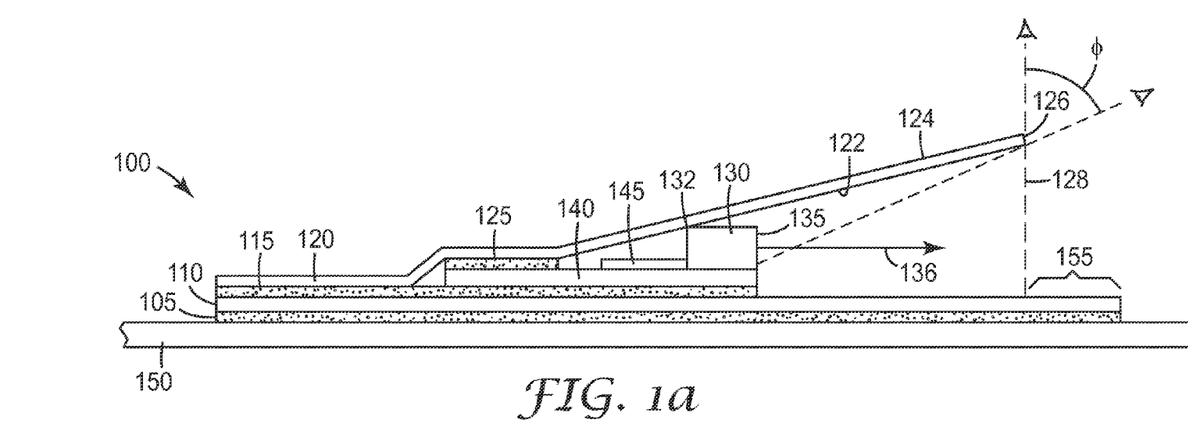
FIGS. 1a-f are schematic side views of collimating light engines.

FIG. 1a depicts a side view of one embodiment of a collimating light engine 100 affixed to back substrate 150 with first adhesive layer 105, according to one aspect of the present disclosure. The collimating light engine 100 of FIG. 1a can be suited for continuous production of light engines as described elsewhere. Collimating light engine 100 includes a light source 130 and circuitry 145 affixed proximate a first surface of a reflector 110. In one embodiment, reflector 110 is a flexible reflector, such as a film. Light source 130 and circuitry 145 can be disposed on a flexible substrate 140, which is in turn affixed to reflector 110 with second adhesive layer 115.

Light source 130 is positioned so that the emission optical axis 136 extends perpendicularly from emitting surface 135, and is generally parallel to reflector 110. In another embodiment, the emission optical axis 136 is generally parallel to a transverse plane bisecting the wedge shape formed by a baffle 120 and reflector 110. Light source 130 can be any light source that emits light from a surface, e.g., LEDs. Light from surface 135 is generally emitted in a hemispherical pattern from surface 135.

The collimating light engine can include any suitable light source including, e.g., a surface emitting LED, such as a blue- or UV emitting-LED with a down-converting phosphor to emit white light hemispherically from the surface; individual colored LEDs, such as arrangements of red/green/blue (RGB) LEDs; and others such as described in PCT Patent Application US2008/064133 entitled "Backlight and Display System Using Same". Other visible light emitters such as linear cold cathode fluorescent lamps (CCFLs) or hot cathode fluorescent lamps (HCFLs) can be used instead of or in addition to discrete LED sources as light sources for the disclosed illumination devices. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs.

Baffle 120 is disposed over light source 130. The baffle 120 extends over a portion of reflector 110 so that light source 130 is obscured by baffle 120 when viewed from above at angles less than φ as shown in the Figure. According to one aspect, the light source 130 is obscured from view at angles φ less than 50, 60, 70, 75, or even 85 degrees. The baffle 120 is affixed to the flexible substrate 140 with third adhesive layer 125. The baffle 120 can also be affixed to reflector 110 with second adhesive layer 115 as shown in the Figure. First, second and third adhesive layers 105, 115, 125 can be the same adhesive material, or they can be different. Any known adhesive material can be used, for example a PSA, a hot-melt, a solvent based, or a curable adhesive can be used. It may be preferred that the thickness of the adhesive material be kept thin, such as less than the thickness of the baffle 120, to keep the overall thickness of collimating light engine 100 small. The baffle 120 generally conforms to the reflector 110 and flexible substrate 140 where it is adhered by second and third adhesive layers 115, 125. However, light source 130 projects from flexible substrate 140 and edge 132 contacts baffle 120, which then angles away from reflector 110, forming an exit aperture 128. As shown in the Figure, exit aperture 128 can be defined by projecting a baffle end 126 onto reflector 110. In one embodiment, exit aperture 128 can include supporting structures such as ribs or posts (not shown) to support baffle end 126.

A transport region 155 extending over a portion of reflector 110 can provide for additional mixing of light emitted through the exit aperture 128, when several collimating light engines 100 are disposed in an array, as described elsewhere. The transport region 155 is the portion of reflector 110 beyond the projection of baffle end 126 onto reflector 110 along exit aperture 128, as indicated in the Figure. Although transport region 155 is shown in the Figures as extending beyond the projection of the baffle end 126, it is to be understood that the transport region can be a separation between the baffles of adjacent collimating light engines, as described elsewhere with reference to FIG. 4 and FIG. 5. In some embodiments, the transport region can include any portion of the light engine that is between angled baffles and serves to mix light from a light engine.

The material including reflector 110 and baffle 120 can be the same or different. In one embodiment, at least one of the reflector 110 and baffle 120 include surface reflectors such as a metallic film or a metallized polymeric film. In another embodiment, at least one of the reflector 110 and baffle 120 include interference reflectors such as organic or inorganic multilayer optical films, as described for example in U.S. Pat. No. 5,882,774. In yet another embodiment, at least one of the reflector 110 and baffle 120 include semi-specular reflectors, described for example in co-pending PCT Patent Application No. US2008/064115, and also in 61/061,230 entitled "ILLUMINATION DEVICE WITH PROGRESSIVE INJECTION", filed on an even date herewith.

Baffle 120 can be a reflective baffle having a first side 122 facing light source 130 and a second side 124 opposite the first side 122. The reflective properties of first and second sides 122, 124 can be the same or different. In one embodiment, at least one of the first and second sides 122, 124 can be selected from a specular reflector, a semi-specular reflector, and a diffuse reflector. In one embodiment, the baffle includes an ESR film, and both first and second sides 122, 124 have similar reflective properties.

The collimating light engine can include any suitable reflector and baffle. In some cases, the reflector and baffle (including the first side, and the second side) can be made from a stiff metal substrate with a high reflectivity coating, or a high reflectivity film which can be laminated to a supporting substrate. Suitable high reflectivity materials include Vikuiti™ Enhanced Specular Reflector (ESR) multilayer polymeric film available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and others including those described in PCT Patent Application US2008/064096.

Baffle 120 can have non-uniform optical or other physical properties. In one embodiment, the portion supported by edge 132 of light source 130 and continuing to baffle end 126 can include materials such as a high bending modulus film, to provide added stiffness in this portion. In another embodiment, the reflective properties of at least one of the first and second side 122, 124 can vary over the baffle. In yet another embodiment, the portion of baffle 120 near baffle end 126 can be serrated, slit, perforated, embossed, or printed to alter the reflective and/or transmissive properties, as described elsewhere.

Figure 1B:
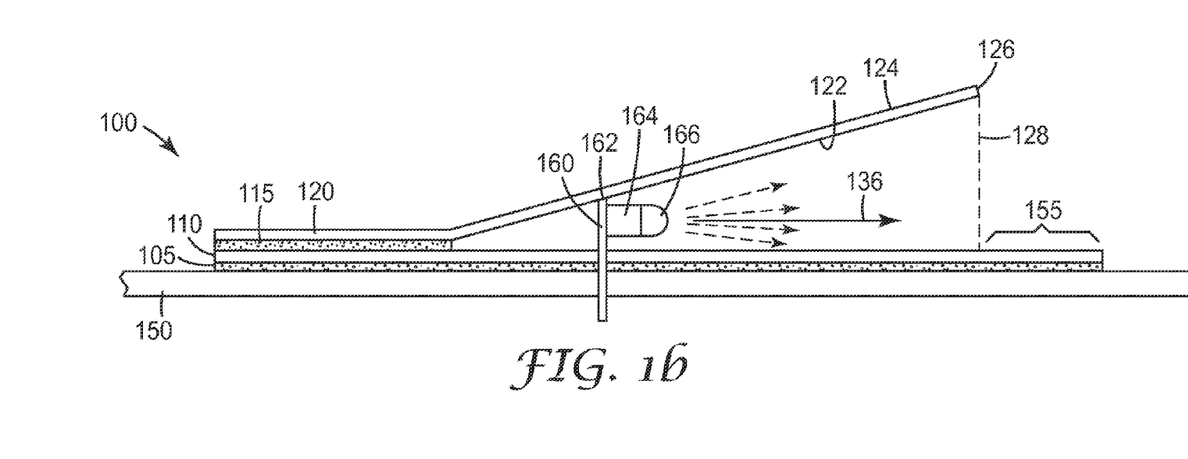

FIG. 1b shows a side view of a collimating light engine 100 affixed to back substrate 150 with first adhesive layer 105, according to another aspect of the disclosure. The collimating light engine 100 of FIG. 1b can be suited for continuous production of light engines as described elsewhere. Like numbered elements in FIG. 1b refer to like numbered elements of FIG. 1a. Collimating light engine 100 includes a light source 164 affixed to a circuit board 160. Light source 164 includes collimating optical element 166, typically a lens, which partially collimates light within a narrow range of angles from optical axis 136. The collimating lens can collimate light in either one or two directions, i.e. generally parallel or generally perpendicular to the transverse plane parallel to reflector 110. Circuit board 160 projects from reflector 110 and provides support for baffle 120 at edge 162.

In one embodiment, light from light source 164 is sufficiently collimated that light does not reflect from first side 122 of baffle 120, and the reflectivity of first side 122 has little effect on the performance of the collimating light engine 100. In one embodiment, light from light source 164 is sufficiently collimated that light does not reflect from reflector 110 in the region between collimating optical element 166 and exit aperture 128, and the reflectivity of reflector 110 in this region has little effect on the performance of the collimating light engine 100.

Figure 1C:
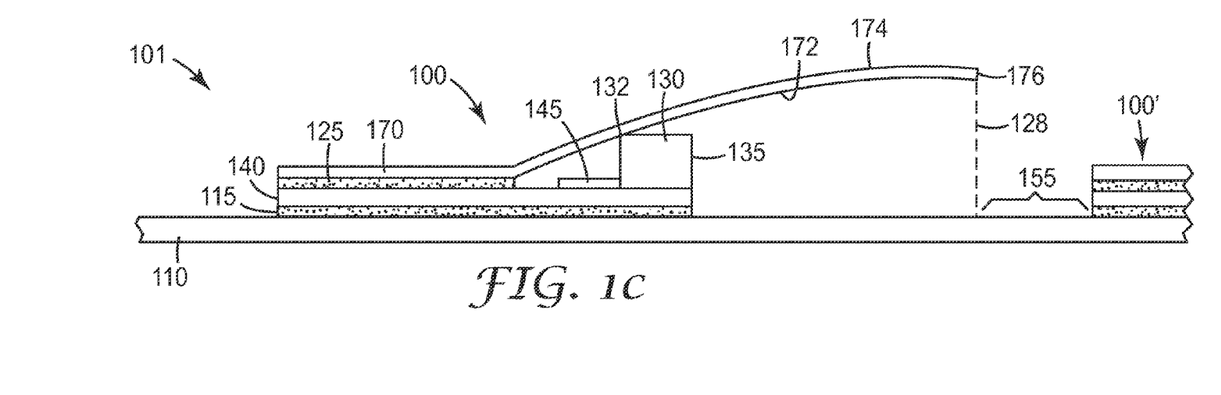

FIG. 1c shows a side view of adjacent light engines 101 which include a first collimating light engine 100 affixed to reflector 110 with second adhesive layer 115, according to another aspect of the disclosure. The adjacent light engines 101 of FIG. 1c can be suited for continuous production of light engines as described elsewhere. A portion of an adjacent second collimating light engine 100' is shown to indicate placement relative to first collimating light engine 100, as described elsewhere. Like numbered elements in FIG. 1c refer to like numbered elements of FIG. 1a. In one embodiment, shaped baffle 170 comprises a parabolic shape as shown in the Figure, which can be useful to partially collimate light parallel to reflector 110. Shaped baffle 170 can be a reflective baffle having a first side 172 facing light source 130 and a second side 174 opposite the first side 172. The reflective properties of first and second sides 172, 174 can be the same or different. In one embodiment, at least one of the first and second sides 172, 174 can be selected from a specular reflector, a semi-specular reflector, and a diffuse reflector. In one embodiment, the baffle includes an ESR film, and both first and second sides 172, 174 have similar reflective properties.

Shaped baffle 170 can be affixed to flexible substrate 140 with third adhesive 125. Additionally, second adhesive layer 115 can extend beyond flexible substrate 140, as shown in FIG. 1a, to provide an additional region for affixing shaped baffle 170. Transport region 155 separates first and second collimating light engines 100, 100'. The length of transport region 155 can be chosen to mix light from light source 130 in a direction parallel to the plane of reflector 110. In one embodiment, collimating light engines 100, 100' can be made on reflector 110 in a continuous fashion, and separated at the transport region 155, as described elsewhere. The collimating light engines can then be affixed to a back substrate 150 with a first adhesive layer 105 as shown in FIG. 1a.

Figure 1D:
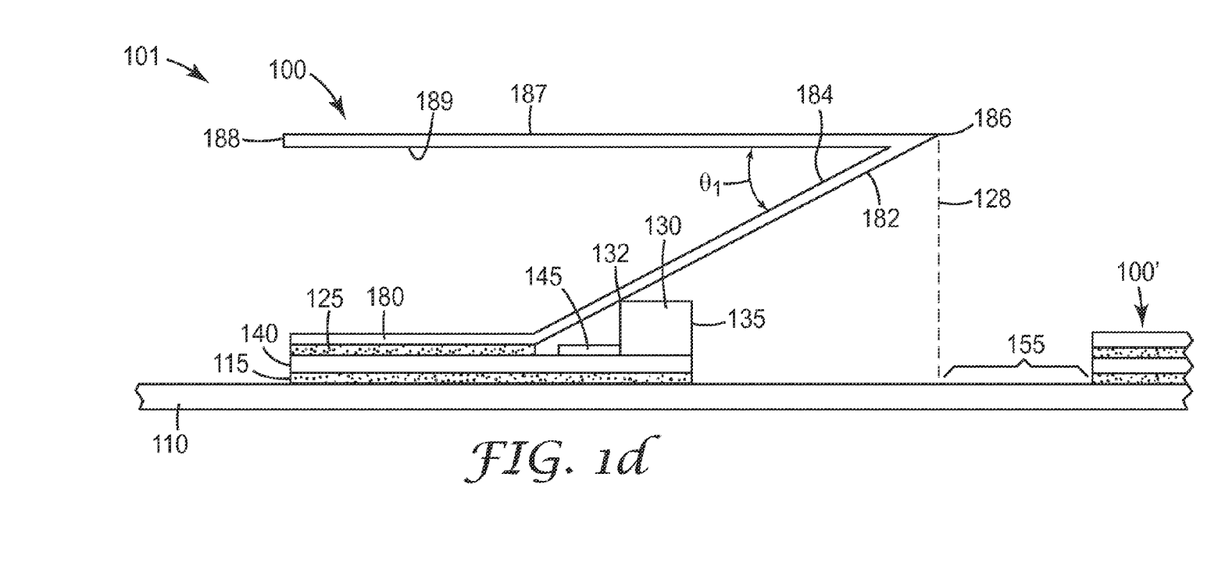

FIG. 1d shows a side view of adjacent light engines 101 that include a first collimating light engine 100 affixed to reflector 110 with second adhesive layer 115, according to another aspect of the disclosure. The adjacent light engines 101 of FIG. 1d can be suited for continuous production of light engines as described elsewhere. A portion of an adjacent second collimating light engine 100' is shown to indicate placement relative to first collimating light engine 100, as described elsewhere. Like numbered elements in FIG. 1d refer to like numbered elements of FIG. 1a. In one embodiment, shaped baffle 180 compares to baffle 120 of FIG. 1a, but has an additional member between ends 186 and 188, that forms an angle θ1 with the shaped baffle member supported by edge 132 of light source 130. Shaped baffle 180 can be a reflective baffle having a first side 182 facing light source 130, a second side 184 opposite the first side 182, third side 187 contiguous with first side 182, and fourth side 189 contiguous with second side 184. The reflective properties of first through fourth sides 182, 184, 187, 189 can be the same or different. In one embodiment, at least one of the first through fourth sides 182, 184, 187, 189 can be selected from a specular reflector, a semi-specular reflector, and a diffuse reflector. In one embodiment, the baffle includes an ESR film, and first through fourth sides 182, 184, 187, 189 have similar reflective properties.

Shaped baffle 180 can be affixed to flexible substrate 140 with third adhesive 125. Additionally, second adhesive layer 115 can extend beyond flexible substrate 140, as shown in FIG. 1a, to provide an additional region for affixing shaped baffle 180. Transport region 155 separates first and second collimating light engines 100, 100'. The length of transport region 155 can be chosen to mix light from light source 130 in a direction parallel to the plane of reflector 110. In one embodiment, collimating light engines 100, 100' can be made on reflector 110 in a continuous fashion, and separated at the transport region 155, as described elsewhere. The collimating light engines can then be affixed to a back substrate 150 with a first adhesive layer 105 as shown in FIG. 1a.

Figure 1E:
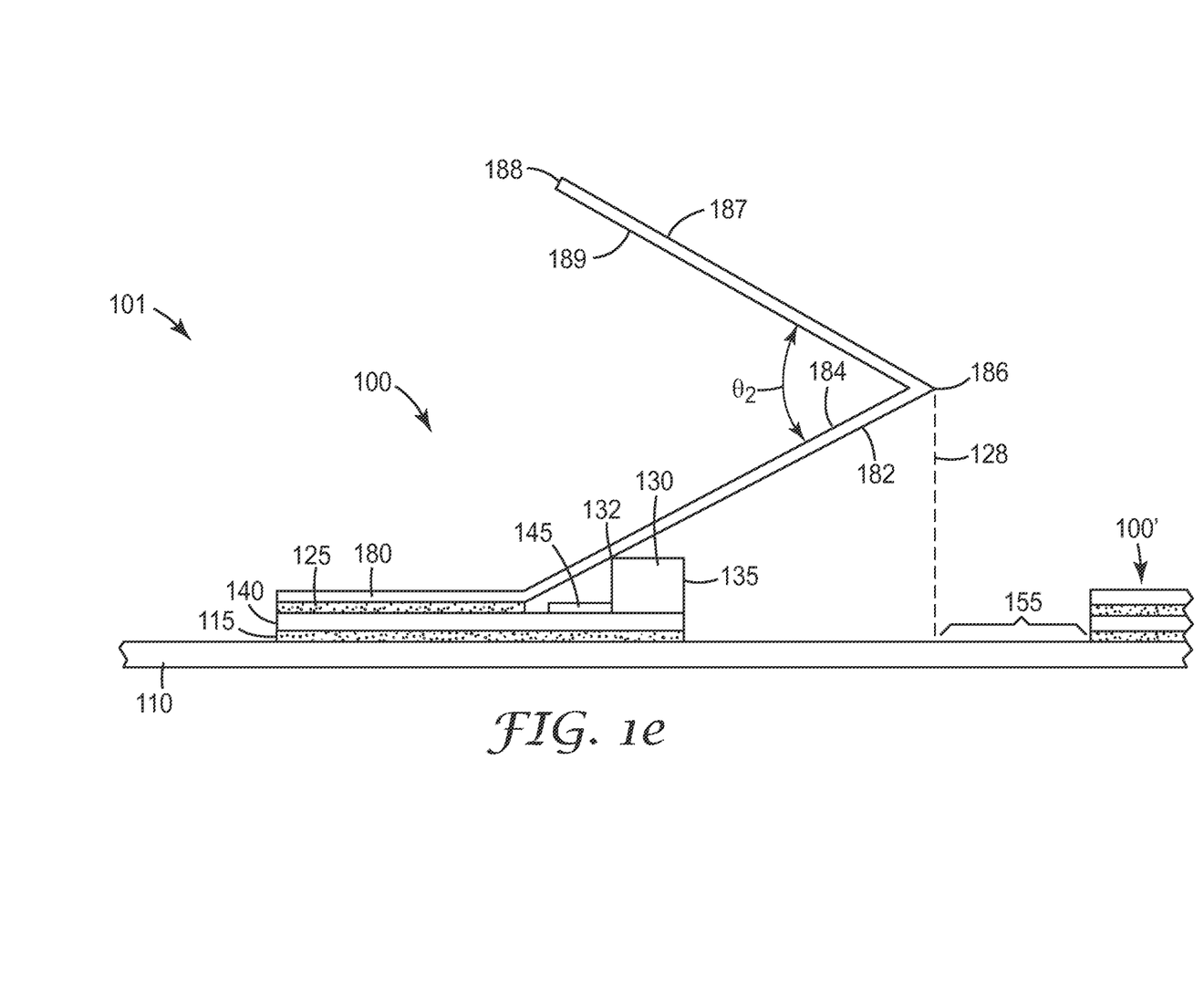

FIG. 1e shows a side view of adjacent light engines 101 which include a first collimating light engine 100 affixed to reflector 110 with second adhesive layer 115, according to another aspect of the disclosure. The adjacent light engines 101 of FIG. 1e can be suited for continuous production of light engines as described elsewhere. A portion of an adjacent second collimating light engine 100' is shown to indicate placement relative to first collimating light engine 100, as described elsewhere. Like numbered elements in FIG. 1e refer to like numbered elements of FIG. 1a and FIG. 1d. In one embodiment, FIG. 1e shows the collimating light engine of FIG. 1d where angle θ1 of shaped baffle 180 is increased to angle θ2, and length of additional member between ends 186 and 188 is decreased from FIG. 1d. In one aspect, additional member between ends 186 and 188 of shaped baffle 180 can re-direct light that is traveling in a direction generally toward light emitting surface 135 along reflector 110, as described elsewhere. In one embodiment, collimating light engines 100, 100' can be made on reflector 110 in a continuous fashion, and separated at the transport region 155, as described elsewhere. The collimating light engines can then be affixed to a back substrate 150 with a first adhesive layer 105 as shown in FIG. 1a.

Figure 1F:
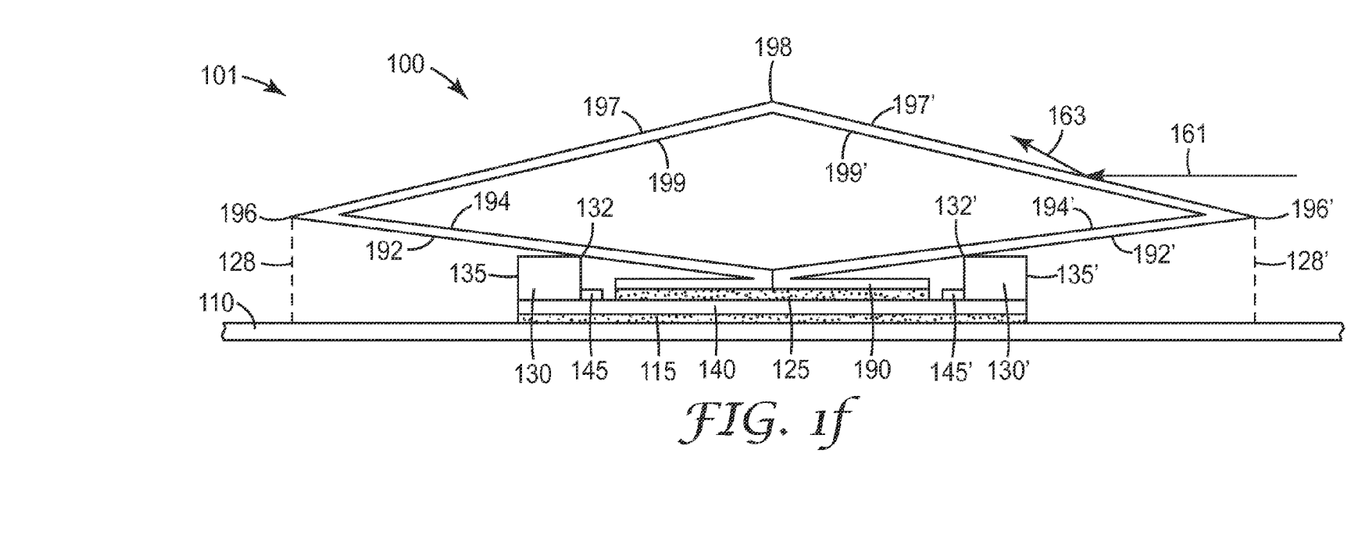

FIG. 1f shows a side view of light engine 101 which includes a collimating light engine 100 affixed to reflector 110 with second adhesive layer 115, according to another aspect of the disclosure. A second collimating light engine 100' (not shown) can be disposed adjacent collimating light engine 100 in a manner similar to that shown in FIG. 1e. The light engine 101 of FIG. 1f can be suited for continuous production of light engines as described elsewhere. Like numbered elements in FIG. 1f refer to like numbered elements of FIG. 1a and FIG. 1e. In one embodiment, FIG. 1f shows light sources 130, 130' and circuitry 145, 145' affixed proximate different ends of flexible substrate 140. Flexible substrate 140 is affixed to reflector 110 with second adhesive layer 115. Emitting surfaces 135, 135' of light sources 130, 130' are disposed to emit light in opposite directions along reflector 110.

Figure 2:
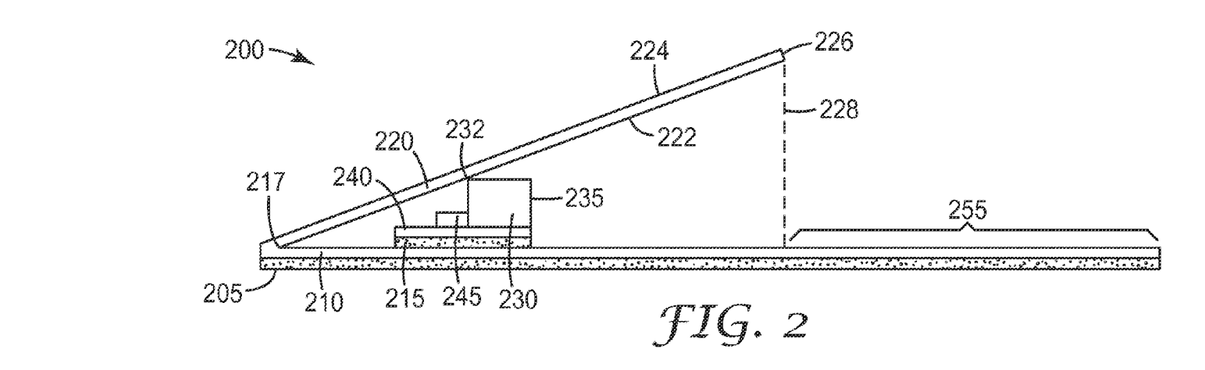
FIG. 2 is a schematic side view of a collimating light engine.

In one embodiment, shaped baffle 190 can be formed as a unitary structure, made for example by folding a film, or forming a rigid structure. In this embodiment, first side 192 is contiguous with third, fourth and fifth sides 197, 197', 192'; second side 194 is contiguous with sixth, seventh and eighth sides 199, 199', 194'. Shaped baffle 190 can be a reflective baffle having a first side 192 facing light source 130, a second side 194 opposite the first side 192. The reflective properties of first through eighth sides 192, 194, 197, 199, 197', 199', 192', 194' can be the same or different. In one embodiment, at least one of the first through eighth sides 192, 194, 197, 199, 197', 199', 192', 194' can be selected from a specular reflector, a semi-specular reflector, and a diffuse reflector. In one embodiment, the baffle includes an ESR film, and first through eighth sides 192, 194, 197, 199, 197', 199', 192', 194' have similar reflective properties. In one aspect, additional members between ends 196, 198 and 196' of shaped baffle 190 can re-direct light into a desired direction. In one embodiment, first light ray 161, traveling in a direction generally parallel along reflector 110, can be re-directed in a direction generally away from reflector 110, as shown by second light ray 162. In one embodiment, collimating light engines 100, 100' can be made on reflector 110 in a continuous fashion, and separated at the transport region 155, as described elsewhere. The collimating light engines can then be affixed to a back substrate 150 with a first adhesive layer 105 as shown in FIG. 1a FIG. 2 shows a side view of a collimating light engine 200 according to another aspect of the disclosure. The collimating light engine 200 of FIG. 2 can be particularly well-suited for continuous production of light engines as described elsewhere. Collimating light engine 200 includes a light source 230 and circuitry 245 affixed proximate a first surface of reflector 210. Light source 230 is positioned as described with reference to light source 130 of FIG. 1a. Light source 230 projects from flexible substrate 240 and edge 232 contacts baffle 220, which then angles away from reflector 210, forming exit aperture 228.

A transport region 255 extending over a portion of reflector 210 can provide for additional mixing of light emitted through an exit aperture 228, when several collimating light engines 200 are disposed in an array, as described elsewhere. The transport region 255 is the portion of reflector 210 beyond the projection of baffle end 226 onto reflector 210 along exit aperture 228, as indicated in the Figure.

Collimating light engine 200 optionally includes first adhesive layer 205 disposed on reflector 210 to facilitate attachment of collimating light engine 200 to another surface, for example the interior of a backlight cavity. Optional adhesive layer 205, if included, can include a release liner (not shown) to protect the adhesive until needed.

In one embodiment shown in FIG. 2, light source 230 and circuitry 245 can be disposed on a flexible substrate 240, which is in turn affixed to reflector 210 with second adhesive layer 215. In another embodiment, circuitry 245 can be disposed directly on reflector 210 by, for example, plating or depositing the circuitry as known in the art. In this embodiment, flexible substrate 240 and second adhesive layer 215 are replaced by a tie-layer known to improve adhesion of circuitry formed directly on a reflector.

A baffle 220 is disposed over light source 230. The baffle 220 extends over a portion of reflector 210 as described with reference to viewing angle φ of FIG. 1a. In one embodiment, baffle 220 is contiguous with reflector 210, and is formed from the same material, for example, by folding reflector 210 at crease 217 to form baffle 220 which is supported by light source 230 at edge 232. In another embodiment, baffle 220 is bonded to reflector 210 at crease 217, for example by thermal, ultrasonic, solvent or mechanical means. A preferred embodiment includes a contiguous baffle 220 and reflector 210 formed by folding at crease 217. In one embodiment (not shown), a second light source can be disposed proximate the transport region, facing the first light source. In this embodiment, a second baffle can be disposed over the second light source, to result in a pair of collimating light engines including the same reflector and the same transport region, and in facing relationship to each other.

Baffle 220 can be a reflective baffle having a first side 222 facing light source 230 and a second side 224 opposite the first side 222. The reflective properties of first and second sides 222, 224 can be the same or different. In one embodiment, at least one of the first and second sides 222, 224 can be selected from a specular reflector, a semi-specular reflector, and a diffuse reflector. In one embodiment, the baffle includes an ESR film, and both first and second sides 222, 224 have similar reflective properties.

Baffle 220 can have non-uniform optical or other physical properties. In one embodiment, the portion supported by edge 232 and continuing to baffle end 226 can include materials such as a high bending modulus film, to provide added stiffness in this portion. In another embodiment, the reflective properties of at least one of the first and second side 222, 224 can vary over the baffle. In yet another embodiment, the portion of baffle 220 near baffle end 226 can be serrated, slit, perforated, embossed, or printed to alter the reflective and/or transmissive properties, as described elsewhere.

FIGS. 3a-3g show selected steps in a process for producing collimating light engines according to one aspect of the disclosure. The generalized process steps described with reference to FIGS. 3a-3g can be performed in either a continuous or a step-wise manner.

Figure 3A:
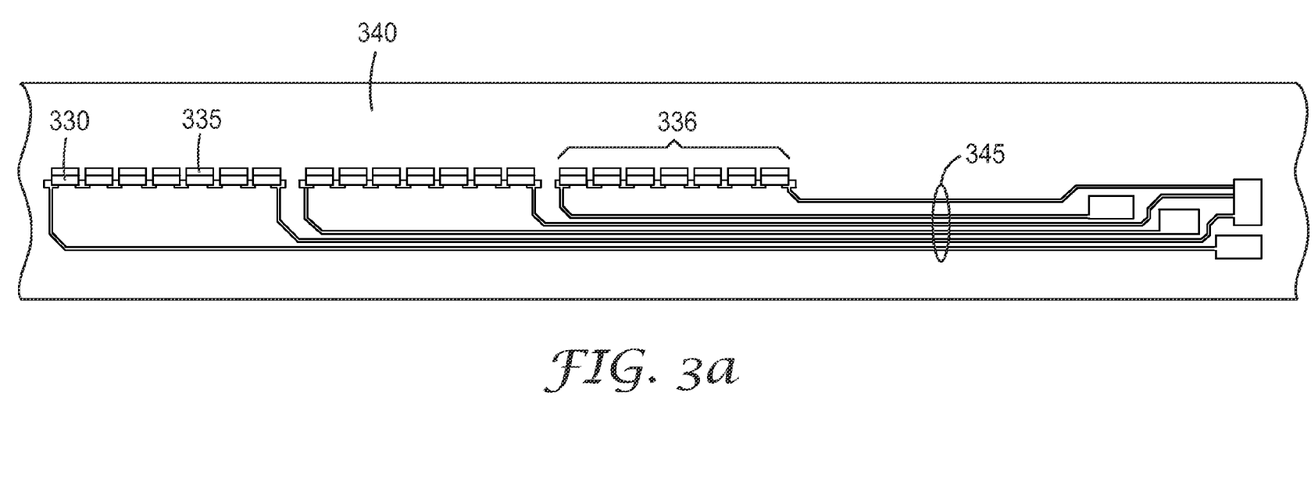
FIG. 3a is a schematic top view of light sources on a flexible circuit.

FIG. 3a shows a plurality of light sources 330 having light emitting surfaces 335 arranged in light source arrays 336 disposed on flexible substrate 340. Any number of light sources 330 arranged in any number of light source arrays 336 can be associated with circuitry 345. In one embodiment, flexible substrate 340 can be a continuous substrate, such as a roll of material, so that the elements shown in the Figure are repeated down the length of the roll. In another embodiment, flexible substrate 340 can be a continuous substrate, such as a roll of material, so that the elements shown in the Figure are repeated across the width of the roll.

Circuitry 345 can be directly formed on flexible substrate 340, and is connected to address light source arrays 336. Light source arrays 336 can include identical light sources 330, or individual light sources 330 can be different, for example different color LED light sources as described elsewhere. In one embodiment, individual light sources 330 can be controlled independently by circuitry 345. In one embodiment, each light source array 336 can be controlled independently by circuitry 345.

Figure 3B:
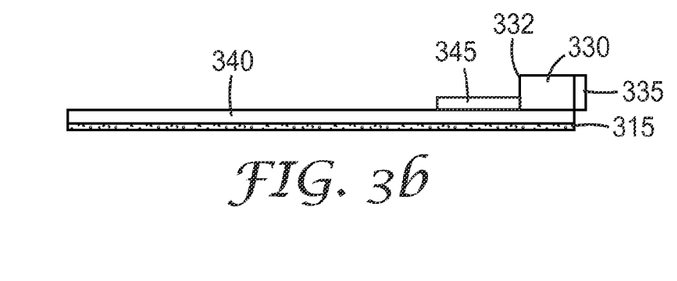
FIGS. 3b-g are schematic side views of a process for making a collimating light engine.
Figure 3C:
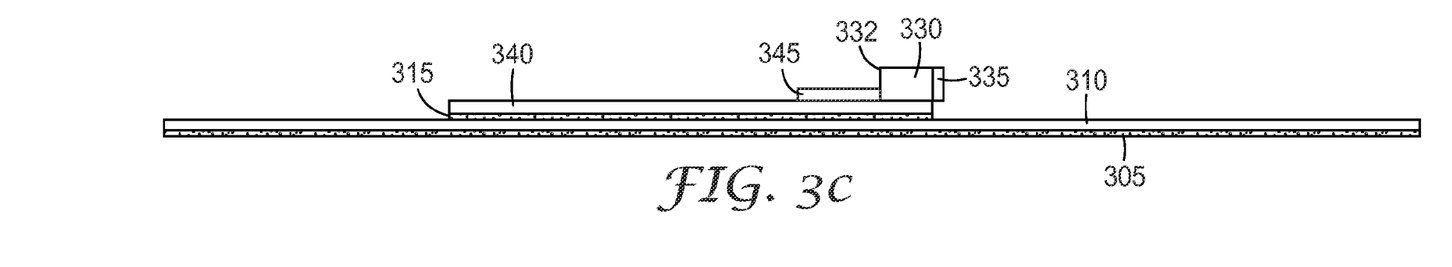
Figure 3D:
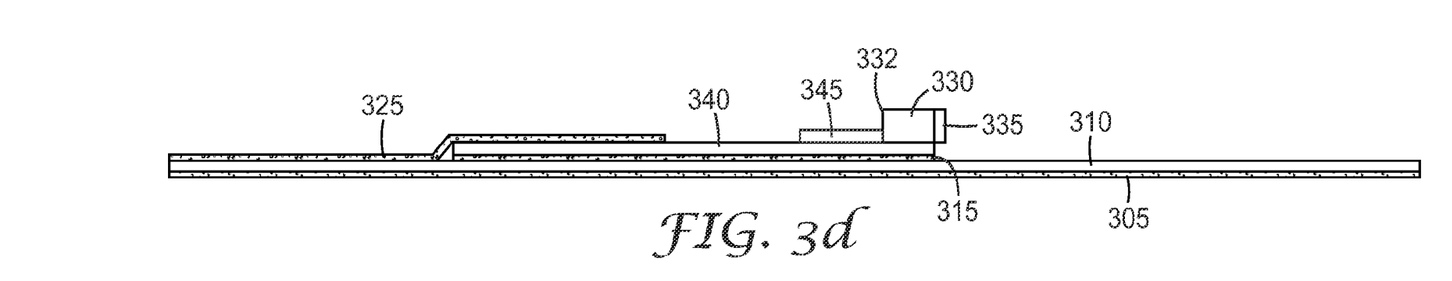
Figure 3E:
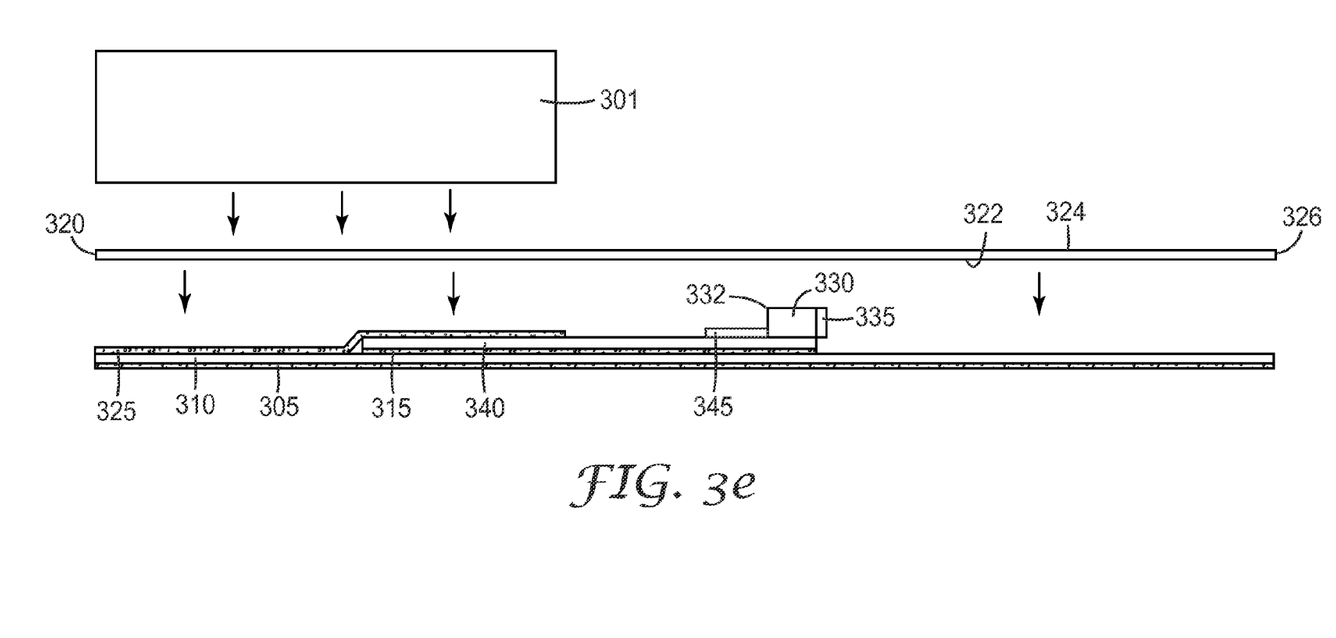
Figure 3F:
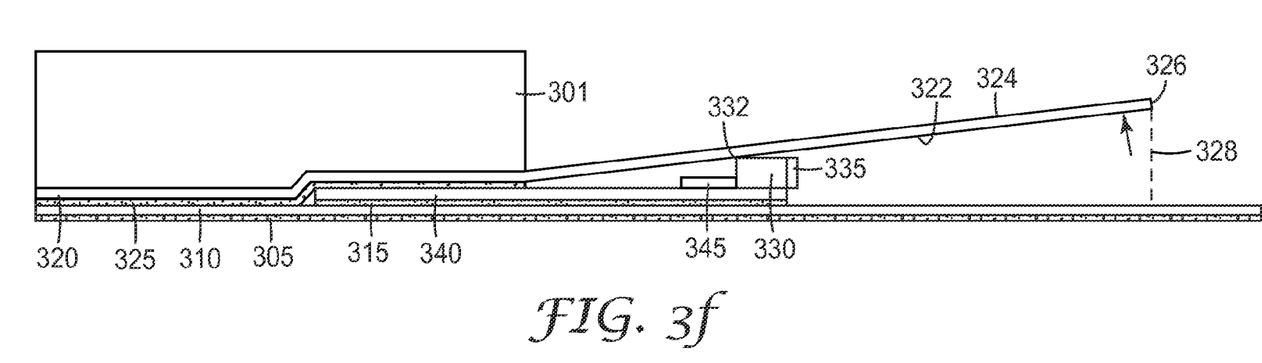

FIG. 3b shows a side-view of the flexible substrate 340 with attached circuitry 345, light source 330 and edge 332, and emitting surface 335 of FIG. 3a. A third adhesive layer 315 is applied to a bottom surface of flexible substrate 340. The article shown in FIG. 3b can then be adhered to a reflector 310 as shown in FIG. 3c by contacting the third adhesive layer 315 with a first side of reflector 310. A first adhesive layer 305 is applied to the second side of reflector 310. In one embodiment, the first adhesive layer 305 is applied before contacting third adhesive layer 315. A release liner (not shown) can be used to protect the free surface of first adhesive layer 305. FIG. 3d shows the article of FIG. 3c coated with a second adhesive layer 325 over a portion of reflector 310 and flexible substrate 340. In FIG. 3e, a baffle 320 is positioned over the article of FIG. 3d, and a compliant material 301, such as a rubber roller or sheet, is used to press the baffle 320 against second adhesive layer 325 as shown in FIG. 3f. Baffle 320 becomes adhered to the article of FIG. 3d, forcing baffle 320 into contact with edge 332 of light source 330, raising end 326 to form exit aperture 328.

Figure 3G:
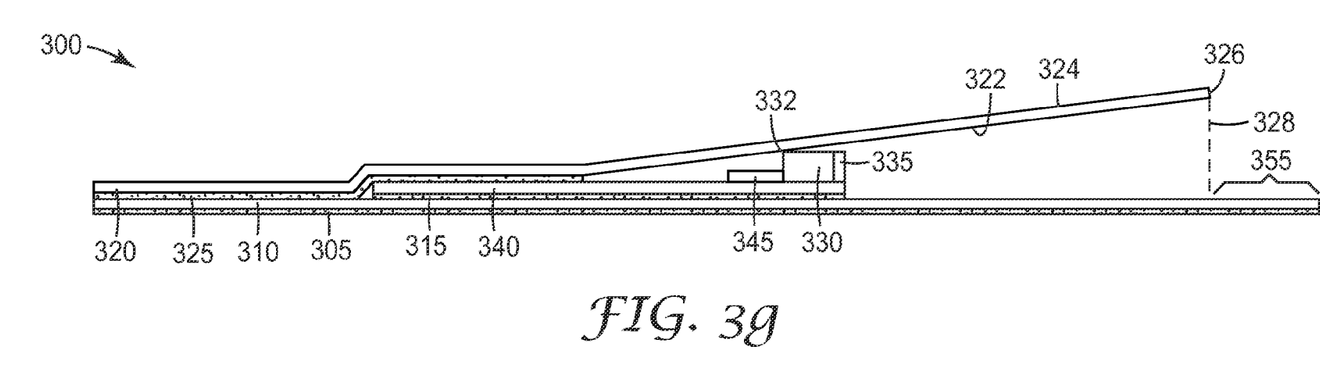

FIG. 3g shows a completed collimating light engine 300 similar to collimating light engine 100 shown in FIG. 1a, and like numbered elements correspond. In one embodiment, slight variations in the procedure outlined in FIGS. 3a-3f can be used to produce any of the collimating light engines described with reference to FIGS. 1a-1f. Individual collimating light engines can be separated from a continuous roll, for example by cutting adjacent the transport region 155.

Collimating light engines according to the embodiments described with reference to FIG. 2 can be produced by a method similar to FIGS. 3a-f, but with fewer steps. In one embodiment, the steps shown in FIGS. 3a-3b are followed, and the article of FIG. 3b is adhered to reflector 310. Reflector 310 is then folded and first adhesive layer 305 is applied as shown in FIG. 2. In another embodiment, the step shown in FIG. 3a is performed directly on reflector 310 as described elsewhere and reflector 310 is then folded and first adhesive layer 305 is applied as shown in FIG. 2.

Figure 4:
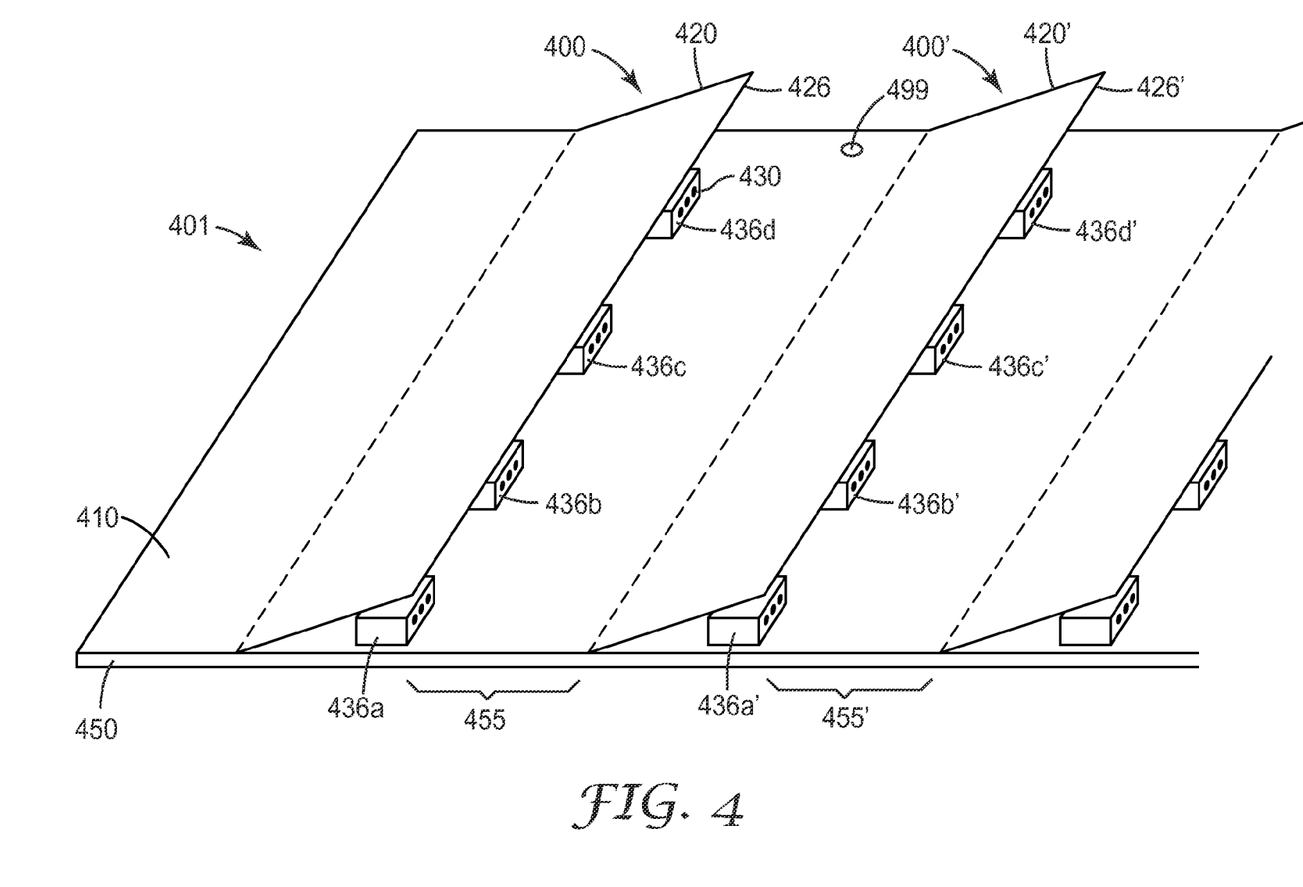
FIG. 4 is a perspective view of an illumination backplane.

The individual collimating light engines can be adhered to a back substrate 150 in an array to produce a lighting element of any desired size or shape, such as shown in FIG. 4, and also further described in 61/061,230 entitled "ILLUMINATION DEVICE WITH PROGRESSIVE INJECTION", filed on an even date herewith. FIG. 4 shows a perspective view of a lighting element 401 that includes collimating light engines 400 and 400' disposed on back substrate 450. Collimating light engine 400 includes reflector 410 affixed to back substrate 450, baffle 420, and light source arrays 436a-d including individual light sources 430. The projection of baffle edge 426 onto reflector 410 defines transport region 455 between adjacent collimating light engines 400 and 400'. The size of transport region 455 can be adjusted to achieve the desired light uniformity between light engines. Collimating light engine 400' includes similar components (labeled with primed numbers), and as shown in the Figure, additional light engines can be added to increase the size of the lighting element as desired.

Figure 5:
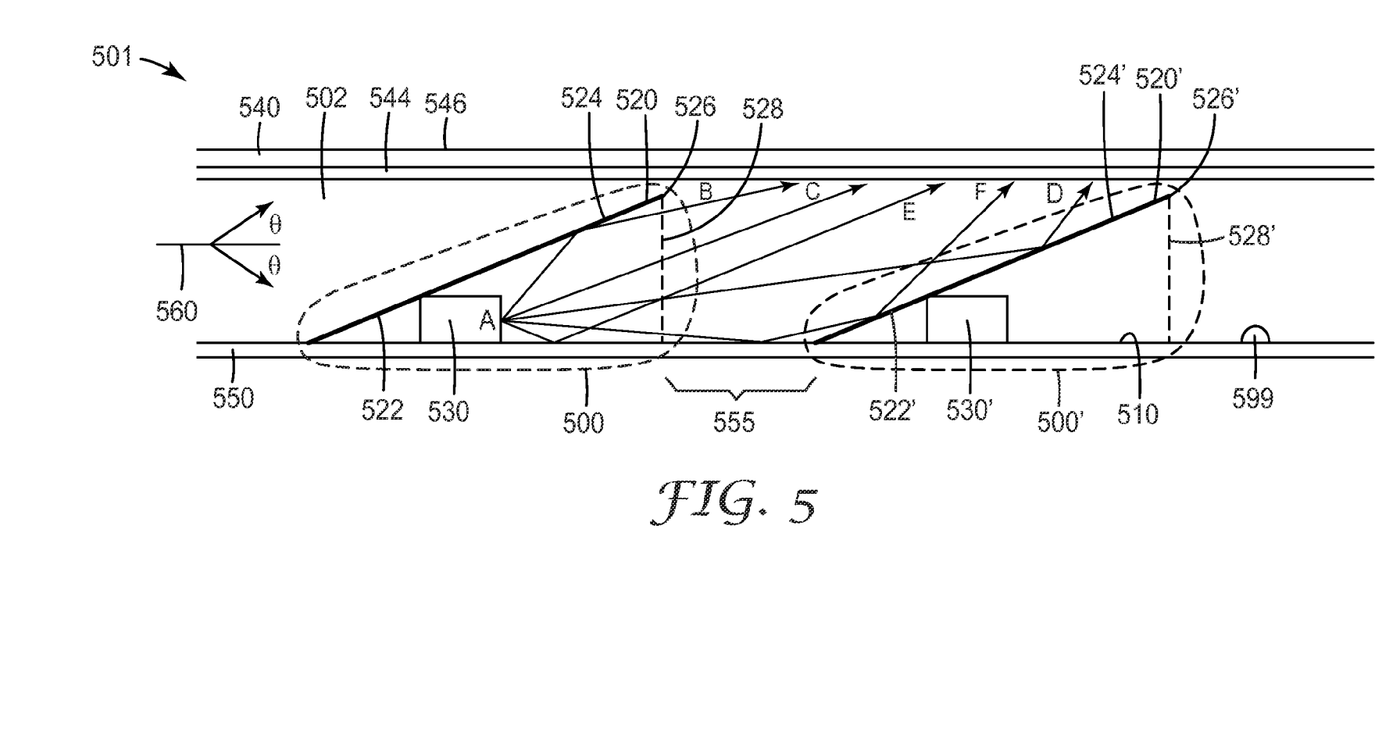
FIG. 5 is a schematic side view of a hollow backlight including collimating light engines.

FIG. 5 shows the path of several representative light rays within a hollow backlight 501 that has a pair of collimating light engines 500, 500' disposed on a back substrate 550 within hollow cavity 502. Collimating light engines 500, 500' include baffles 520, 520', baffle edge 526, 526', exit apertures 528, 528', first side 524, 524', and second side 522, 522', respectively, as described elsewhere. Light rays AB, AC, AD, AE, and AF are injected into hollow cavity 502 by light source 530 disposed within first collimating light engine 500. In FIG. 5, light source 530 is shown to be positioned between baffle 520 and a reflective substrate 510, and injects light in a direction generally along the length of the hollow cavity 502. In one embodiment, light source 530 can be located below the plane defined by reflective substrate 510, and positioned to inject light generally perpendicularly to the length of the hollow cavity, to reflect from baffle 520 and be re-directed along the length of the hollow cavity (not shown).

Light source 530 can be a surface emitting LED, for example a blue- or UV emitting-LED with a down-converting phosphor to emit white light hemispherically from the surface, or others as described elsewhere. For a surface-emitting LED, first light ray AB reflects from second side 522 of baffle 520, passes through exit aperture 528, and is directed toward a transmissive front film 540. Second light ray AC passes through exit aperture 528 and is directed toward transmissive front film 540 without reflection. Third light ray AD passes through exit aperture 528, reflects from first side 524' of baffle 520' (of second collimating light engine 500'), and is directed toward transmissive front film 540. Fourth light ray AE reflects from reflective substrate 510 within first collimating light engine 500, passes through exit aperture 528, and is directed toward transmissive front film 540. A fifth light ray AF passes through exit aperture 528, reflects from back reflector within transport region 555, reflects from first side 524' of baffle 520' (of second collimating light engine 500'), and is directed toward transmissive front film 540. As shown in FIG. 5, each light ray AB, AC, AD, AE, AF can pass through additional optical films 544 before exiting hollow backlight 501 through output surface 546. Baffles 520, 520' are positioned so that light rays from first light source 530 are generally confined to travel through hollow cavity 502 within a range of angles θ close to a transverse plane 560. Transverse plane 560 is generally parallel to an output surface 546 of hollow backlight 501, and θ ranges within an average deviation angle from the transverse plane 560 in a range from 0 to 40 degrees, or 0 to 30 degrees, or 0 to 15 degrees. Light rays (not shown) originating from second light source 530' in second collimating light engine 500' can undergo similar paths to those described above.

FIG. 5 shows that light injected from the light injector can undergo a variety of reflections before being directed to transmissive front film 540. Transmissive front film 540 can be any film suitable for the output surface of a backlight, including a partially transmissive front reflector, a diffuse film, a semi-specular reflector, combinations thereof, or any other suitable films such as described in 61/061,230 entitled "ILLUMINATION DEVICE WITH PROGRESSIVE INJECTION", filed on an even date herewith. The combination of these interactions with different surfaces within the hollow cavity 502 provide for a homogenization of the light so that non-uniformities become minimized. Further, the transport region 555 serves to allow additional mixing, as well as to enable an increase in the physical separation distance between sources. The baffles placed within the hollow cavity serve to "hide" the LED sources from the output surface 546, blocking the direct line of sight view of the sources, as described elsewhere. As the length of the transport region increases, there is a decrease of radiation flux through the hollow cavity, resulting in a decrease in the brightness of the illumination device. For at least this reason, progressively more light can be injected through additional injection ports to increase the radiation flux, and extend the useable length of the backlight.

At one or more positions within the hollow cavity, a light sensor 599 can be placed to monitor the light intensity, and any one or several of the light sources can be adjusted by, for example, a feedback circuit. Control of the light intensity can be either manual or automatic, and can be used to independently control the light output of various regions of the illumination device.

EXAMPLES

Film-Based Collimating Light Engine

A string of side-emitting white LEDs, each 0.6 mm high and 1.3 mm long (Nichia NSSW006T LEDs, available from Nichia, Japan) were mounted so that the emitting surface was aligned with an edge of a flex circuit 11.7 mm wide. The mounted string of LEDs corresponded to the arrangement shown in FIG. 3*a* (three parallel banks of seven LEDs in series). The flex circuit was adhered to a 28.6 mm wide strip of ESR film (3M Company) so that the emitting surface was 10 mm from the front edge of the ESR film, and the opposite edge of the flex circuit was about 6.8 mm from the back edge of the ESR film. Adhesive was applied about 13.7 mm from the back edge of the ESR film, covering about 6.8 mm of the flex circuit, and a second strip of ESR film was pressed onto the adhesive, resulting in a collimating light engine similar to that shown in FIG. 3*g*. The first strip of ESR film corresponds to the reflector 310, and the second strip of ESR film corresponds to the baffle 320 in that Figure. The resulting film-based collimating light engine had an exit aperture of 2.2 mm and an overall length of about 29 mm. The resulting wedge aspect ratio (ratio of height of exit aperture 328 to height of LED edge 332 above reflector 310) for this film-based collimating light engine was about 2:1.

The distance between the light emitting surface of the LED (surface 335 in FIG. 3*g*) and the front edge of the ESR (reflector 110) depends upon the pitch spacing of the LEDs. For the case of all white LEDs, this distance should be greater or equal to the pitch of the LEDs. For an evenly pitched RGBG color cluster of LEDs, the distance should be greater or equal to 4× the LED pitch. The collimating light engine was adhered to an ESR film backplane which had been previously laminated to a 0.004" thick stainless steel shim stock.

Example 1

Total Luminous Flux of Film-Based Injectors

The total luminous flux (TLF) of a film-based light injector was measured in an Optronic integrating sphere by peeling back the upper ESR film that forms the wedge, fully exposing the LEDs so that they could emit into the sphere without obstruction. The three parallel banks of seven Nichia NSSW0006T LEDs (in series), were run at a total current of 30 mA with a steady state voltage of 19.8V. Power consumption was 0.59 watts total. The TLF was measured to be 49.94 lumens, and this TLF value was taken to represent 100% of the ideal light emission from the light engine. The upper ESR film was then returned to the original position so that the maximum height of the ESR above the backplane was about 2.2 mm, forming a 2:1 expanding wedge from the LED location. The TLF measured in the configuration was 47.95 lumens, indicating that the engine was 96% efficient.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A collimating light engine, comprising:
   a reflector having a first surface;
   a light source and circuitry affixed proximate the first surface; and
   a baffle disposed over and in contact with the light source and extending over a portion of the reflector forming a hollow light collimating wedge, so that the light source is obscured from view at angles less than 50 degrees from the normal to the reflector,
   wherein at least one of the reflector or the baffle includes a semi-specular reflector, and wherein the baffle and the reflector comprise a unitary folded film.

2. The collimating light engine of claim 1, wherein the light source has an optical axis of emission generally parallel to the first surface of the reflector.

3. The collimating light engine of claim 1, wherein the reflector is a specular reflector or a semi-specular reflector.

4. The collimating light engine of claim 1, wherein the reflector is a multilayer interference reflector.

5. The collimating light engine of claim 1, wherein at least one of the reflector and the baffle comprises an optical interference layer.

6. The collimating light engine of claim 1, wherein the light source and circuitry are disposed on a circuitized substrate, and the circuitized substrate is affixed to the reflector.

7. The collimating light engine of claim 6, wherein the circuitized substrate is flexible.

8. The collimating light engine of claim 1, wherein the baffle has a first surface facing the light source and a second surface opposite the first surface, and wherein at least one of the first and second surfaces is reflective to light.

9. The collimating light engine of claim 1, wherein light emitted from the light source is partially collimated to within 30 degrees of a transverse plane parallel to the reflector.

10. The collimating light engine of claim 1, wherein the light source comprises an LED.

11. The collimating light engine of claim 10, wherein the LED is capable of emitting light in an angular spread of less than 360 degrees around a normal to the reflector.

12. The collimating light engine of claim 1, wherein the baffle is affixed over the light source by an adhesive.

13. The collimating light engine of claim 1, further comprising:
   a second light source and circuitry affixed proximate the first surface, so that the second light source has an optical axis of emission generally parallel to the first surface of the reflector, and in a direction facing the first light source; and
   a second baffle disposed over and in contact with the second light source and extending over a portion of the reflector forming a hollow light collimating wedge, so that the second light source is obscured from view at angles less than 50 degrees from the normal to the reflector.

14. A backlight comprising the collimating light engine of claim 1.

15. The backlight of claim 14, wherein a plurality of collimating light engines are disposed on a rigid substrate, along a direction parallel to the optical axis of emission.

16. The backlight of claim 15, wherein each of the plurality of collimating light engines are independently controllable.

17. The backlight of claim 14, further comprising a light sensor in optical communication with the collimating light engine.

18. An illumination device comprising the backlight of claim 14.

19. A luminaire comprising the collimating light engine of claim 1.

* * * * *